3,064,677
METERING VALVE DEVICE FOR RECIRCU-
LATING FLOWLINES
Jay L. Wright and Lewis N. Tenney, Phoenix, and Alman
A. Allen, Glendale, Ariz., assignors to Wright Manu-
facturing Co., Phoenix, Ariz., a corporation of Arizona
Filed Dec. 7, 1959, Ser. No. 857,840
11 Claims. (Cl. 137—556)

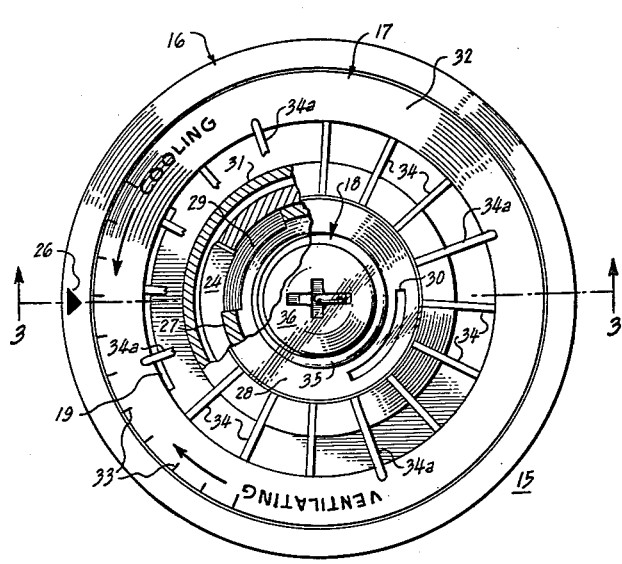

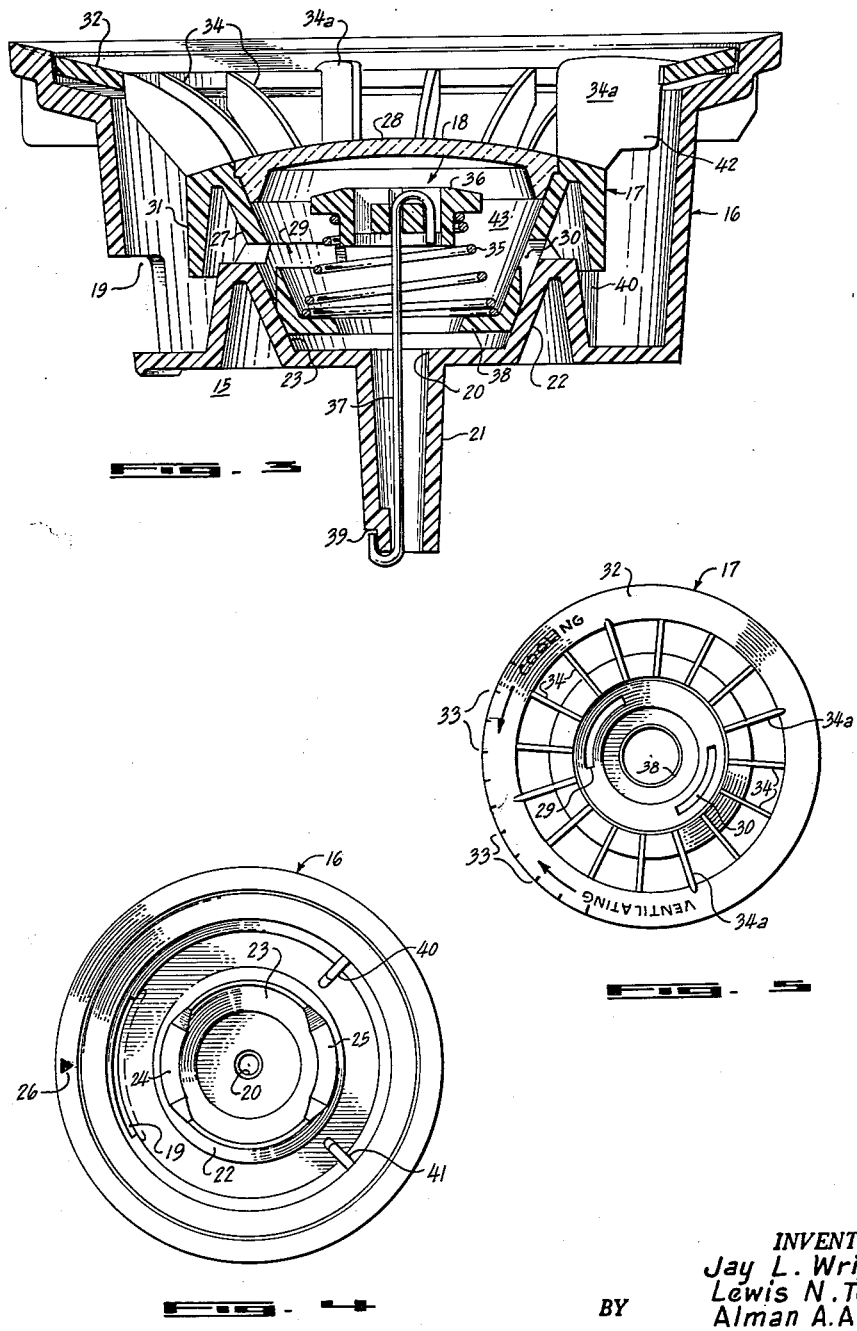

This invention relates to rotary type metering valves, and more specifically involves a valve device that is adapted for use in a recirculated flowline that also is to be metered. The valve device as herein illustrated and described is of particular advantage and utility in the recirculated flow system of conventional evaporative air coolers.

Evaporative air coolers operate upon the principle that heat energy is given up in the process of evaporating water, thus producing a cooling effect. The degree of cooling derived from such coolers may be controlled by varying the quantity of water evaporated. In recirculating types of coolers a given amount of water is continually recirculated through a porous evaporating pad, generally made of excelsior, and the degree of cooling is controlled by adjusting the water flow through a metering valve in the return flowline. Since the loss of water to the atmosphere is an inherent part of its operation as an evaporative cooler, it is necessary to periodically replenish these recirculating systems with water.

In view of the above described operation of a recirculating evaporative cooler, it is one object of this invention to provide a valve device for metering the flow therethrough and including means for introducing additional amounts of water if required.

A second object is to provide a valve device for metering fluid flow including means for observing the fluid condition in the flowline and introducing additional amounts of water if required.

Another object of this invention is to provide a liquid-fill metering valve device comprising a liquid receiving bowl having an inlet opening and an outlet opening and defining an inner rotary valve casing circumjacent said inlet opening, said valve casing havng a slotted opening therein that forms a discharge passageway between said inlet and outlet openings, and a rotatable valve body fitted within said valve casing and having a passageway therein communicating with said inlet opening, said passageway having a slotted termminal opening adapted to be rotatably positioned into various degrees of radial alignment with said slotted valve casing opening; whereby liquid may be introduced through said device into a fluid system whose fluid flow is circulated through said device and thereby metered.

Other objects of this invention will become apparent in view of the drawings and the following description.

In the drawings, forming a part of this application, and in which like parts are identified by like reference numerals throughout the same, FIG. 1 is an elevational view of a recirculating evaporative cooling system including one embodiment of a valve device as contemplated by this invention;

FIG. 2 is a top plan view of the valve device used in the recirculating system of FIG. 1, said device having a portion cut away to show the cooperation between valve slot openings;

FIG. 3 is a vertical section of the valve device taken on lines 3—3 of FIG. 2;

FIG. 4 is a top plan view of the liquid receiving bowl of the valve device; and

FIG. 5 is a top plan view of the valve body element that fits into the receiving bowl.

Referring to FIG. 1 of the drawings, there is shown a conventional arrangement for a recirculating type evaporative cooler comprising a water trough 10, an excelsior pad 11, a catch pan 12, and a return flowline 13, including a motorized pump 14. Flowline 13 also includes a novel valve device 15 through which the water flow is metered. Valve device 15 provides means for observing the fluid conditions of the flowline and enables additional amounts of water to be added, as will be more clearly explained.

It will be understood in view of FIG. 1 that water in the catch pan 12 is pumped upward through the valve device 15 and allowed to spill into trough 10, from which it drains downwardly through the excelsior pad 11. A blower fan (not shown) either pushes or pulls air through the pad 11 evaporating quantities of water, thereby producing a cooling effect. Unevaporated water passes into the catch pan 12 and is then recirculated. This operation continues until the water supply is exhausted, at which time the condition of depletion may be observed by inspection of the valve device 15. A fresh supply of water may then be added to the system by introducing it through the valve device.

The novel valve device 15 is more particularly shown in FIGS. 2–5, and in view thereof, it will be seen that it is generally comprised of an outer annular receiving bowl and valve casing 16, an inner valve body element 17, and means 18 for holding said parts together.

The receiving bowl 16 is provided with a discharge opening 19 in its side surface and a coaxial inlet opening 20, said inlet opening communicating with a connecting inlet tube 21. The bottom surface of the bowl is also fromed with a valve casing 22 circumvallating the opening 20 and having an inner valve surface 23 shaped as an inverted conical frustum. Slotted openings 24 and 25 are provided through casing 22 on diametrically opposite sides and along the larger base dimension of the frustum. The upper rim of bowl 16 is outwardly flanged and is provided with an indicator marking 26 showing the relative position of a center line through slotted openings 24 and 25.

Valve body element 17 is comprised of a valve sleeve 27 whose outer surface is shaped as a conical frustum that mates with the valve surface 23 and a transparent annular member 28 which is pressed into the upper end of the valve sleeve, sealing the end thereof. Slotted openings 29 and 30 are provided in the valve sleeve on diametrically opposite sides thereof, said openings being of approximately equal size to slotted openings 24 and 25 and positioned to cooperate therewith as a metering device. An outer coaxial flange 31 depends from the upper end of the sleeve to a level below the lower lip of slotted openings 24 and 25; and an annual marking ring 32, provided with graduated markings 33 indicating the position of the valve element 17 relative to bowl 16, is mounted concentrically with the bowl and valve body upon vane-like spoke members 34.

It will be noted that the spoked vanes 34 which support the marking ring 32 are, generally, arcuately formed along their upper peripheral surface. However, four quadrantally spaced vanes 34a project outwardly beyond the arcuate surface of the other vanes. These four vanes enhance digital engagement of the valve element for manipulating said valve element into one of its metering positions.

Valve element 17 is biased inwardly toward the valve casing 22 by means 18 comprising a coiled spring 35, a plug 36 and a latching hook 37. As best illustrated by FIG. 3, spring 35 seats upon a flanged collar 38 provided on the smaller base end of the frustum shaped valve sleeve. Hook 37, having plug 36 fastened at one end, extends through coil spring 35, opening 20 and tube 21, and engages a recessed lip 39 at the end of tube 21. The length of the hook member 37 is sufficiently short to insure that spring 35 is placed into compression when assembled.

A stop means is provided for limiting relative rotating movement of sleeve 27 within the valve casing of bowl 16. As most clearly shown in FIG. 4, this stop means comprises spaced vane members 40 and 41 which are provided on the inner surface of bowl 16. A complementary stopping surface 42 is provided upon a vaned spoke 34a, and upon assembling the valve element into bowl 16 the vaned surface 42 is located between vane members 40 and 41.

The angular spacing of members 40 and 41 is determinative of the selected degree of valve rotation, and this spacing is preferably made to allow valve sleeve 27 to be rotatively moved and positioned between extreme positions of valve slot alignment and valve slot misalignment.

The operation of the valve device is as follows:

With parts assembled as illustrated in FIGS. 2 and 3, fluid is directed upwardly through tube 21 and opening 20 into a compartment 43, defined by the interior of valve sleeve 27. The amount of fluid which is allowed to pass through valve device 15 is, of course, controlled by the relative alignment of slotted openings 29 and 30 with respective openings 24 and 25. Since the degree of relative slot alignment may be manually selected by positional adjustment of the valve element 17 in the valve casing of bowl 16, the rate of fluid flow through device 15 may be varied between zero flow and a predetermined maximum. Accordingly, the rate of fluid flow through the device can be regulated by rotating annular ring 32 to a selected position of slot opening alignment.

If the position of the valve sleeve is such that openings 29 and 30 are fully mated with respective openings 24 and 25, then the maximum fluid flow will occur therethrough, the liquid flowing into the receiving bowl and out the discharge opening 19. The level of liquid in compartment 43 may be determined at any time by looking through the transparent member 28. Should the fluid content in the system be depleted and no liquid appear in the compartment, then a prescribed quantity can be added to the system by pouring that quantity into the receiving bowl.

While there is illustrated a preferred embodiment of this invention, it is to be understood that various changes in the size, shape and the arrangement of certain members and parts can be made without departing from the spirit of this invention or the scope of the attached claims, and each of such changes is contemplated.

Having thus described our invention, what we claim and desire to secure by Letters Patent is:

1. A liquid-fill metering valve device comprising: a liquid receiving bowl having an open cavity with a relatively unobstructed upper opening allowing liquid to be periodically introduced into said bowl, said bowl further having inlet and outlet openings formed therein and including an inner valve partition disposed between said inlet and outlet openings, said partition having a slotted opening therein that forms a discharge passageway between said inlet and outlet openings; rotatable valve means positioned into engagement with said valve partition for obstructing or allowing the passage of liquid from said inlet through said slotted and outlet openings; and means for retaining said valve body into engagement with said valve partition while allowing liquid to be introduced through said upper opening; whereby liquid may be introduced through the upper opening of said device into a fluid system whose fluid flow is circulated through said inlet and outlet openings.

2. The liquid-fill metering device of claim 1 wherein said inlet opening is formed in the botttom surface of said liquid receiving bowl and said valve partition defines an inner rotary valve casing circumjacent said inlet opening and separating said inlet and outlet openings, said valve casing being disposed in spaced relation to said outlet opening.

3. The liquid-fill metering device of claim 2 and further including stop means for limiting rotatable movement of said valve means in said valve casing between positions of slot-opening alignment and complete misalignment.

4. The liquid-fill metering valve device of claim 1 wherein said means for retaining said valve means into engagement with said valve partition is resilient.

5. The liquid-fill metering valve device of claim 1 wherein the open cavity of the liquid receiving bowl is annular and said inlet opening is formed centrally in the bottom surface of said bowl, and wherein said valve partition defines an inner rotary valve casing having a rotational axis coincident with the generating axis of said annular cavity, said valve casing circumvallating said inlet opening with an inverted conical surface and being disposed in spaced relation to said outlet opening.

6. The liquid-fill metering device of claim 5 and further wherein said valve means includes a conical valve body fitted within said valve casing and having a passageway therein communicating with said inlet opening, said passageway having a slotted terminal opening adapted to be rotated into various degrees of radial alignment with the slotted opening of said valve casing.

7. A liquid-fill metering valve device comprising a liquid receiving bowl having a rim and defining an annular cavity generated upon a generating axis, a coaxially formed inlet opening, and a side outlet opening; an inner rotary valve casing having a rotational axis coincident with said generating axis of said annular cavity, said valve casing circumvallating said inlet opening and having a slotted opening that forms a discharge passageway between said inlet and outlet openings, said valve casing also being disposed in spaced relation to said outlet opening for allowing liquid to be introduced into said cavity and passed through said outlet opening; a valve member having an annular body portion fitted within said valve casing and having a passageway therein communicating with said inlet opening, said passageway having a slotted terminal opening adapted to be rotated into various degrees of radial alignment with said slotted valve casing opening, said valve member also having an annular ring mounted concentrically with said annular bowl upon spoke members radiating from said body portion, said ring being positioned in close proximity to the rim of said bowl; and indicia imprinted upon the rim of said bowl and said ring for indicating the relative position of said slotted openings; whereby liquid may be introduced through said device into a fluid system whose fluid flow is circulated through said metering device.

8. A liquid-fill metering valve device comprising a liquid receiving bowl having a rim and defining an annular cavity generated upon a generating axis, a coaxially formed inlet opening, and a side outlet opening; an inner rotary valve casing having a rotational axis coincident with said generating axis of said annular cavity, said valve casing circumvallating said inlet opening and having a slotted opening that forms a discharge passageway between said inlet and outlet openings, said valve casing also being disposed in spaced relation to said outlet opening for allowing liquid to be introduced into said cavity and passed through said outlet opening; a valve member having an annular body portion fitted within said valve casing and having a passageway therein communicating with said inlet opening, said passageway having a slotted terminal opening adapted to be rotated into various degrees of radial alignment with said slotted valve casing opening, said valve member also having an annular ring mounted concentrically with said annular cavity upon spoke members radiating from said body portion, said ring being positioned in close proximity to the rim of said bowl; means biasing said valve member into and against said valve casing; and indicia imprinted upon the rim of said bowl and said ring for indicating the relative position of said slotted openings; whereby liquid may be introduced through said device into a fluid system whose flow is circulated through said metering device.

9. A liquid-fill metering valve device comprising a liquid receiving bowl defining an annular cavity with a centrally formed inlet opening and a side outlet opening, an inner rotary valve casing having a rotational axis coincident with the generating axis of said annular cavity, said valve casing circumvallating said inlet opening with an inverted conical surface and having a slotted opening that forms a discharge passageway between said inlet and outlet openings, said valve casing also being disposed in spaced relation to said outlet opening for allowing liquid to be introduced into said cavity and passed through said outlet opening; an annular valve sleeve fitted within said valve casing and having a retained end open to said inlet opening with a slotted opening adapted to be positioned into various degrees of radial alignment with said slotted valve casing opening, said valve sleeve including an outer axial flange depending from said sleeve and circumvallating said valve casing; and a transparent annular member disposed in the end of said sleeve remote from said retained end for preventing fluid flow through said sleeve; whereby liquid may be introduced through said device into a fluid system whose fluid flow is circulated through said metering device.

10. A liquid-fill metering valve device comprising a liquid receiving bowl having a rim and defining an annular cavity generated upon a generating axis, a coaxially formed inlet opening, and a side outlet opening; an inner rotary valve casing having a rotational axis coincident with said generating axis of said annular cavity, said valve casing circumvallating said inlet opening and having a slotted opening that forms a discharge passageway between said inlet and outlet openings, said valve casing also being disposed in spaced relation to said outlet opening for allowing liquid to be introduced into said cavity and passed through said outlet opening; an annular valve sleeve fitted within said valve casing and having a retained end open to said inlet opening and a slotted opening adapted to be positioned into various degrees of radial alignment with said slotted valve casing opening, said valve sleeve including an outer coaxial flange depending from said sleeve and circumvallating said valve casing; an annular ring mounted concentrically with said annular cavity upon spoke members radiating from said sleeve, said ring being positioned in close proximity to the rim of said bowl; a transparent annular member disposed in the end of said sleeve remote from said retained end for preventing fluid flow through said sleeve; and indicia imprinted upon the rim of said bowl and said ring for indicating the relative position of said slotted openings; whereby liquid may be introduced through said device into a fluid system whose fluid flow is circulated through said metering device.

11. A liquid-fill metering valve device comprising a liquid receiving bowl defining an annular cavity with a centrally formed inlet opening and a side outlet opening, an inner rotary valve casing having a rotational axis coincident with the generating axis of said annular cavity, said valve casing circumvallating said inlet opening with an inverted conical surface and having a slotted opening that forms a discharge passageway between said inlet and outlet openings, said valve casing also being disposed in spaced relation to said outlet opening for allowing liquid to be introduced into said cavity and passed through said outlet opening; an annular valve sleeve fitted within said valve casing and having a retained end open to said inlet opening and a slotted opening adapted to be positioned into various degrees of radial alignment with said slotted valve casing opening, said valve sleeve including an outer coaxial flange depending from said sleeve and circumvallating said valve casing; means biasing said sleeve into and against said valve casing; and a transparent annular member disposed in the end of said sleeve remote from said retained end for preventing fluid flow through said sleeve; whereby liquid may be introduced through said device into a fluid system whose liquid flow is circulated through said metering device.

References Cited in the file of this patent

UNITED STATES PATENTS

| 1,674,743 | Rudolph | June 26, 1928 |
| 2,951,501 | Thylefors | Sept. 6, 1960 |

FOREIGN PATENTS

| 211,713 | Germany | July 10, 1909 |
| 550,883 | Great Britain | Jan. 28, 1943 |